United States Patent [19]

Thomas

[11] 4,413,918
[45] Nov. 8, 1983

[54] THRUST BEARING FOR ROCK BITS

[75] Inventor: Robert D. Thomas, Arlington, Tex.

[73] Assignee: Smith International, Inc., Newport Beach, Calif.

[21] Appl. No.: 379,692

[22] Filed: May 19, 1982

[51] Int. Cl.³ .................. F16C 33/00; F16C 17/04
[52] U.S. Cl. .................................. 384/95; 384/243; 384/420
[58] Field of Search .............. 308/173, DIG. 8, 219, 308/241; 384/95, 92, 93, 94, 96, 275, 282, 281, 261, 420, 425, 427, 310, 312, 295, 240, 226, 243, 228; 175/371, 372

[56] References Cited

U.S. PATENT DOCUMENTS

| 2,690,935 | 10/1954 | Alexander | 384/96 |
| 3,720,274 | 3/1973 | McCallum | 175/372 |
| 3,795,430 | 3/1974 | Farley | 308/241 |
| 3,995,917 | 12/1976 | Quinlan | 384/95 |
| 4,005,914 | 2/1977 | Newman | 308/241 X |
| 4,136,748 | 1/1979 | Dickerhoff | 384/92 X |
| 4,323,284 | 4/1982 | Childers et al. | 308/DIG. 8 X |

FOREIGN PATENT DOCUMENTS 2034786 6/1980 United Kingdom ................ 175/372

Primary Examiner—Stuart S. Levy
Assistant Examiner—Thomas R. Hannon
Attorney, Agent, or Firm—Robert G. Upton

[57] ABSTRACT

An intermediate thrust bearing is positioned between the rotating cutters and its bearing pin of an earth-boring bit. The intermediate bearing is so configured to take outthrust loads, without rotation, that are directed axially against a radially disposed surface of the roller cone journal as the rock bit works in a borehole.

3 Claims, 3 Drawing Figures

4,413,918

THRUST BEARING FOR ROCK BITS

BACKGROUND OF THE INVENTION

1. Field of the Invention

This invention relates to thrust bearing washers for rotary cone rock bits.

More specifically, this invention relates to a means to prevent rotation of an intermediate thrust bearing washer radially disposed between a roller cone and a journal, the washer being primarily designed to take axial thrust loads.

2. Description of the Prior Art

There are a number of prior art patents that provide some means between rotating cones and their respective journals to take axially directed outthrust loads directed against radial surfaces formed on the journal bearings.

It is within the state of the art to provide a hard metal bearing surface on radially disposed areas of the journal and the cone by either depositing hard metal material to either the end of the journal or within radially disposed surfaces in the cone. The deposited hard metal material is subsequently machined to provide a smooth bearing surface between the journal and the rotating cone.

The problems that emerge utilizing the foregoing techniques are many. For example, when hard metal material is metallurgically deposited either within the cone or on radially disposed surfaces of the journal, the heat generated causes stress risers that can result in cracks, especially in the rotating cones. In addition it is difficult, costly and time consuming to machine these rough hard metal deposition surfaces to form good bearing surfaces essential to the proper operation and longevity of the rock bit.

The present invention overcomes this difficulty by simply providing a hard metal, nonrotating washer between the journal and the cone.

U.S. Pat. No. 3,720,274 teaches the use of an intermediate thrust bearing washer freely disposed within radially aligned surfaces formed between the end of a journal bearing and a rotating cone associated therewith. The thrust bearing serves to support thrust loads and stabilizes the cone cutters. The intermediate thrust bearing washer is allowed to float between the pin and the journal. A difficulty with this arrangement is that, as the rock bit wears in an operating mode, the thrust washer begins to gall, causing the bearing to eventually fail.

The present invention obviates the problem of the floating thrust washer in that a hard metal radial surface is provided in the form of an elliptical washer that is fixed within the cone so that it will not rotate. The elliptical washer thereby provides a stable thrust bearing surface. Moreover, no additional rotating parts are necessary and problems associated with hard metal deposition methods, i.e., cracking and uneven heat distributions through the cone, are essentially eliminated.

SUMMARY OF THE INVENTION

It is therefore an object of this invention to provide a nonrotating thrust washer to take outthrust axial loads between the journal and the associated cone of a rotary rock bit.

More specifically, it is an object of this invention to provide an elliptical thrust washer that is inserted into a complementary elliptical recess in a radially disposed surface formed, for example, within the rotary cone. The thrust washer then is retained within the rotary cone, thereby preventing rotation of the thrust washer while providing a hard metal bearing surface between the rotary cone and the radially disposed surface as defined on an associated journal bearing.

A rotary rock bit is disclosed having a bit body with an upper end connectable to a drillstring. At least one bearing journal extends from an opposite end of the body. The bearing defines at least one radially disposed bearing surface thereby. A cutter cone is rotatably positioned on the journal. The cutter cone defines at least one radially disposed bearing surface. The cone bearing surface is so configured to mate with the radially disposed bearing surface formed by the bearing journal. At least one intermediate thrust bearing is positioned between the radially disposed bearing surfaces formed by the journal and the cone. The intermediate bearing is retained between the journal and bearing by intermediate bearing retention means. The bearing retention means prevents rotation of the intermediate thrust bearing when the cone is rotated on the journal.

An advantage then over the prior art is the use of a nonrotating radially disposed thrust bearing between the end of a rock bit journal and its associated cone.

Another advantage over the prior art is the use of a nonrotating hard metal thrust bearing between the journal and the cone without metallurgically bonding the thrust bearing into the cone or the end of the journal of the rock bit.

Still another advantage over the prior art is the elimination of the hard metal deposition process wherein hard metal is deposited within the radially disposed bearing surface in the cone with subsequent machining of the hard metal deposition to form a hard metal bearing surface.

The above noted objects and advantages of the present invention will be more fully understood upon a study of the following description in conjunction with the detailed drawings.

DESCRIPTION OF THE PREFERRED EMBODIMENTS AND BEST MODE FOR CARRYING OUT THE INVENTION

Figure 1:
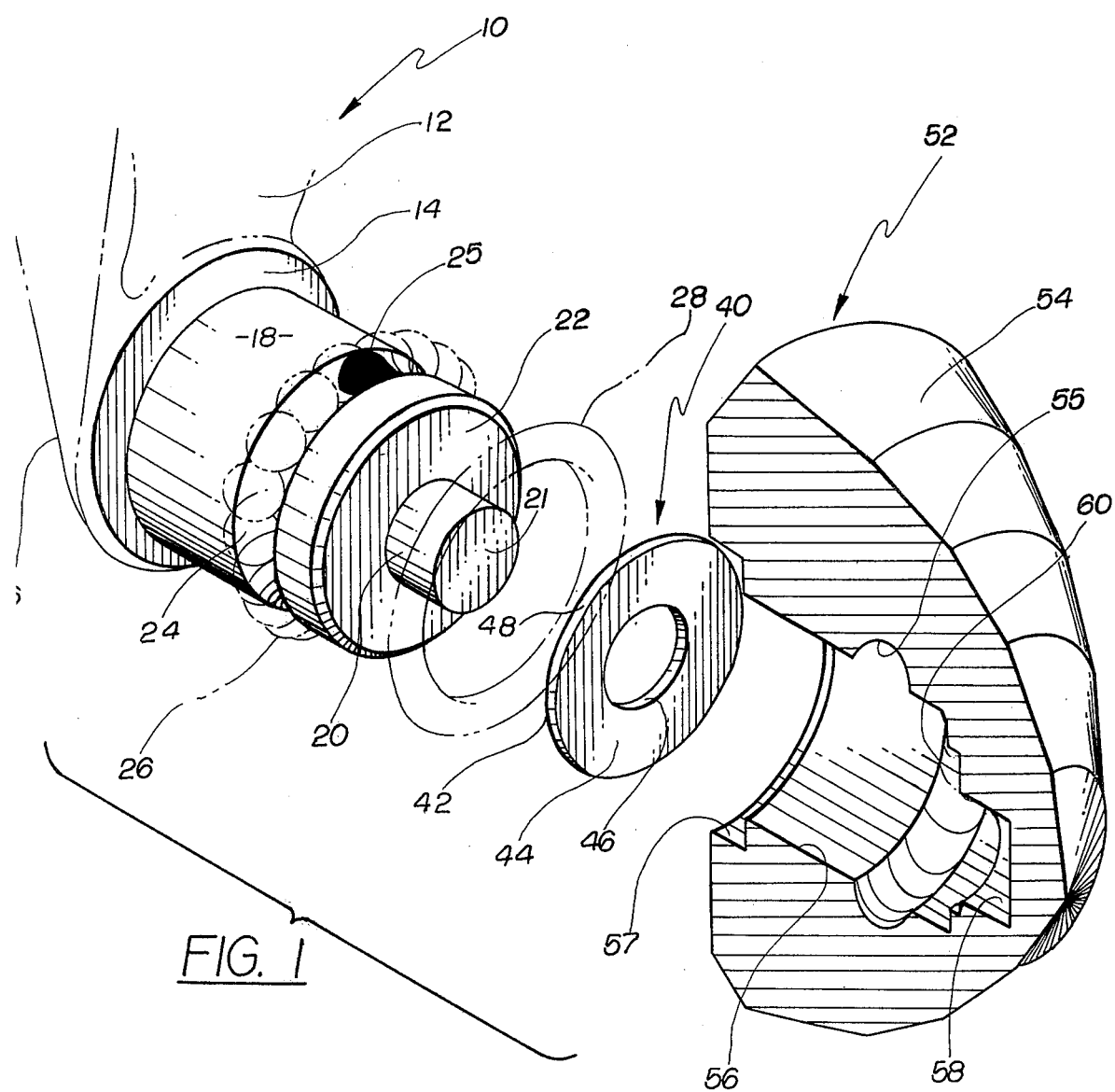
FIG. 1 is a partially cutaway exploded perspective view of the preferred embodiment of the present invention.

Referring now to the perspective exploded view of FIG. 1, a lower portion of a rock bit leg, generally designated as 10, depicts the leg 12, cone backface 14, shirttail 16 and journal 18 cantilevered from the leg 12. Journal 18 defines a cone retention ball track 24 and radially disposed snoochie face 22. A spindle bearing 20, of reduced diameter, extends from snoochie 22 and termninates in thrust button 21. A series of, for example, steel balls 26 (shown in phantom line) retain a cone, generally designated as 52, onto journal bearing 18. The balls 26 are inserted after the track 55 in cone 52 registers with the track 24 on journal 18. When the cone is properly positioned on the journal, the balls are inserted through a ballhole in backface 16 (not shown). The balls exit through bearing access hole 25, intercepting track 24.

A radially disposed thrust washer, generally designated as 40, defines a first journal bearing surface 42 and a second cone bearing surface 44. The bearing disc further forms a peripheral edge 48 and an inner spindle opening 46. The peripheral edge 48 formed by the thrust bearing is preferably elliptical in shape so that it may register with an identical elliptical recess cavity 60 formed within the cone 52. Cone 52 additionally forms radial load bearing surface 56 and reduced diameter bearing surface 58 to mate with both the journal 18 and the spindle 20. A seal gland 57 is formed in the base of cone 52 to accept an O-ring seal 28, seal 28 serving to protect the bearing surfaces during operation of the bit in a borehole. The peripheral edge 48 of thrust bearing 40 is designed to fit within identical elliptical recess or cavity 60 in the cone. The thrust bearing thus is prevented from rotating when the assembled cone rotates on journal 18.

The intermediate elliptical thrust bearing 40 is preferably fabricated from a hard metal material, such as tungsten carbide, or the bearing could be a composite with a base material of steel having, for example, a hard metal deposition of AMPCO-TRODE 300 aluminum bronze on surface 42 of bearing 40. AMPCO-TRODE is produced by AMPCO METALS, INCORPORATED, Milwaukee, Wis. Another hard metal material suitable for deposition on a steel-based elliptical bearing 40 is HC-1 hardfacing rod, a cobalt-based alloy with major constituents of chromium and tungsten. HC-1 is deposited again on the surface 42, the bearing surface that contacts snoochie 22 of journal 18. HC-1 hardfacing rod can be obtained from STOODY COMPANY, Industry, Calif., and is classified under Code 1477.

The hardfacing material, whether it is AMPCO-TRODE or HC-1 is preferably metallurgically deposited on surface 42 (adjacent snoochie 22), followed by machining and polishing to form a suitable bearing surface. The bearing surface 42 is fabricated from hard metal to take outthrust axial loads subjected to the snoochie face 22 of journal 18 during operation of the rock bit. The bearing 40 is again prevented from rotation within the cone to prevent galling of the bearing retention cavity 60, thus adding to the longevity of the rock bit as it works in a borehole.

Figure 2:
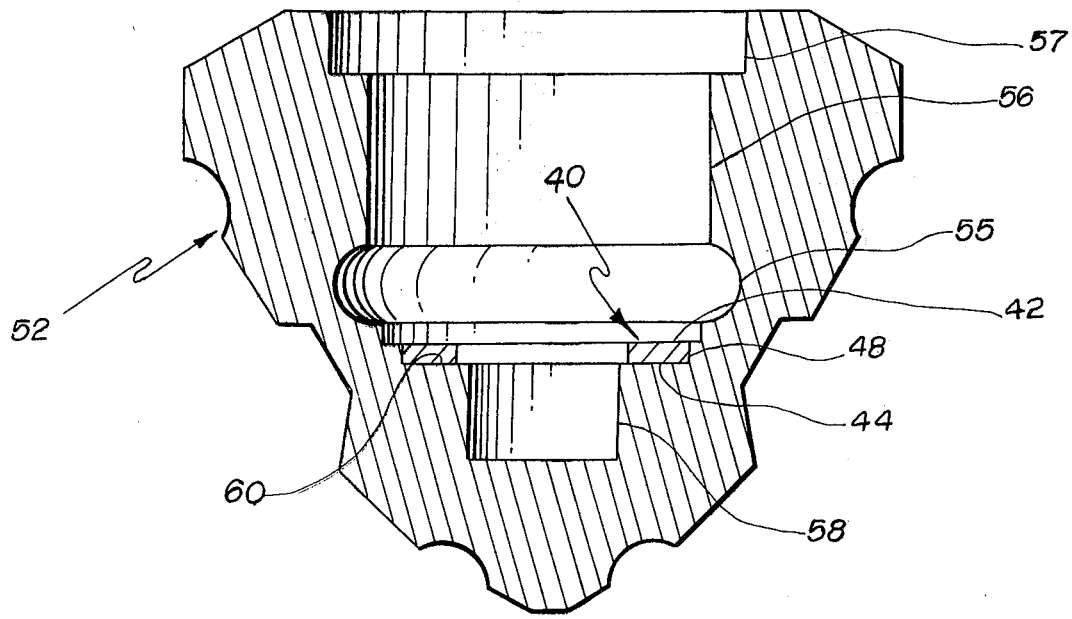
FIG. 2 is a cutaway view of a cone of the rotary cone rock bit.

Turning now to FIG. 2, the cross section of the cone 52 clearly shows the relationship of the intermediate elliptical thrust bearing 40 and how it is retained within an identical elliptical cavity 60 in the cone 52.

Figure 3:
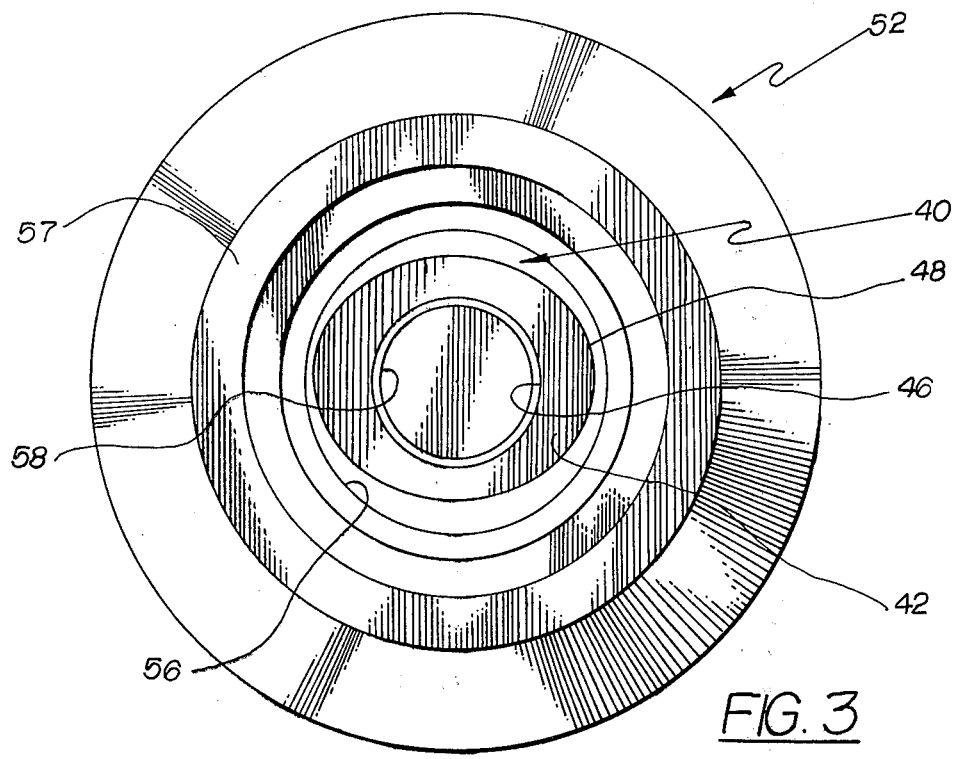
FIG. 3 is a view taken through 3—3 of FIG. 2 illustrating the elliptically shaped thrust bearing mounted or retained within a complementary elliptical retention cavity formed in the cone.

FIG. 3, looking down into the bearing cavity of the cone, depicts the elliptical retention cavity 60 positioned near the apex of the cone. The intermediate thrust washer or bearing 40 is dropped within this identical elliptical cavity, thus preventing the hard metal bearing from rotating in the cone as heretofore described. By machining the elliptical cavity 60 in the cones through, for example, a numerical controlled operation, the necessity to hardface the radially disposed bearing surface 60 in the cone 52 is eliminated. By subjecting this area near the apex of the cone to excessive heat during the deposition process of the hard metal, uneven stresses are created, causing cracks in the cone as well as the hardness of the cone. In addition, it is very difficult to machine this hard metal surface to provide a smooth bearing surface so that the cone will ride against the snoochie face 22 on a journal without excessive friction. Thus a very expensive and time consuming operation is eliminated by simply machining the elliptical cavity in a cone to accept the elliptical intermediate thrust bearing fabricated from a hard metal.

By preventing the intermediate thrust bearing from rotating, in effect the same condition is created in the cone that the hard metal deposition process created except better quality control is maintained, thereby providing a more reliable product.

It would be obvious to provide an intermediate thrust bearing for a cone and journal combination wherein the spindle is eliminated. In other words, a flat, elliptically shaped intermediate thrust bearing is fabricated, the inner surface of which is adjacent a flat snoochie surface without the spindle (not shown). This configuration, while not shown, would simply position a radially disposed elliptical journal bearing in a cavity in the cone, conforming to the same elliptical shape of the thrust bearing, the bit being assembled as heretofore described.

It would also be obvious to provide the elliptical bearing cavity 60 for bearing 40 in the snoochie face 22 of journal 18.

In addition, it would be obvious within the teachings of this invention to provide a peripheral edge 48 other than elliptical. For example, the disc or washer could be shaped in a hexagon, an octagon, etc. (not shown).

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

I claim:
1. A rotary rock bit comprising:
   a bit body having an upper end connectable to a drillstring;
   at least one bearing journal extending from an opposite end of said body, said bearing journal defining at least one radially disposed bearing surface thereby;
   a cutter cone rotatably positioned on said journal, said cutter cone defining at least one radially disposed bearing surface, said cone bearing surface being so configured to mate with said at least one radially disposed bearing surface formed by said bearing journal; and
   at least one intermediate radially disposed thrust bearing positioned between said radially disposed bearing surfaces formed by said journal and said cone, said intermediate bearing is retained between said intermediate bearing journal and bearing by intermediate bearing retention means, an outside peripheral edge formed by said intermediate radially disposed thrust bearing is noncircular, said noncircular bearing registers with a matching noncircular cavity formed in said cone, said noncircular cavity formed in said cone prevents rotation of said intermediate bearing when said cone is rotated on said journal.

2. A rotary rock bit comprising:
   a bit body having an upper end connectable to a drillstring;
   at least one bearing journal extending from an opposite end of said body, said bearing journal defining at least one radially disposed bearing surface thereby;

a cutter cone rotatably positioned on said journal, said cutter cone defining at least one radially disposed bearing surface, said cone bearing surface being so configured to mate with said at least one radially disposed bearing surface formed by said bearing journal; and at least one intermediate radially disposed thrust bearing positioned between said radially disposed bearing surfaces formed by said journal and said cone, said intermediate bearing is retained between said journal and bearing by intermediate bearing retention means, an outside peripheral edge formed by said intermediate radially disposed thrust bearing is noncircular, said noncircular peripheral edge of said thrust bearing is substantially elliptical in shape, said elliptical thrust bearing registers with a matching elliptical cavity formed in said cone, said elliptical cavity formed in said cone prevents rotation of said intermediate bearing when said cone is rotated on said journal.

3. A rotary rock bit comprising:

a bit body having an upper end connectable to a drillstring;

at least one bearing journal extending from an opposite end of said body, said at least one journal bearing comprises a first portion with a first diameter, a second portion with a second diameter, said second diameter being smaller than said first diameter, a radially disposed journal bearing thrust surface being formed between said first portion and said second portion;

a cutter cone rotatably positioned on said journal, said cutter cone defining at least one radially disposed bearing surface, said cone bearing surface being so configured to mate with said at least one radially disposed bearing surface formed by said bearing journal; and at least one intermediate thrust bearing positioned between said radially disposed bearing surfaces formed by said journal and said cone, said intermediate bearing is retained between said journal and bearing by intermediate bearing retention means, an outside peripheral edge formed by said intermediate radialy disposed thrust bearing is noncircular, said noncircular peripheral edge of said thrust bearing is substantially elliptical in shape, said elliptical thrust bearing registers with a matching elliptical cavity formed in said cone said elliptical cavity formed in said cone prevents rotation of said intermediate bearing when said cone is rotated on said journal said intermediate radially disposed thrust bearing is a washer positioned between said bearing thrust surfaces formed between said journal and said cone, said intermediate thrust bearing washer forming a central opening with a diameter slightly larger than said second diameter of said second portion of said journal to allow said second diameter of said journal bearing to pass therethrough.

* * * * *